UNITED STATES PATENT OFFICE.

RALPH H. McKEE, OF LAKE FOREST, ILLINOIS.

PROCESS OF PRODUCING POTASSIUM COMPOUNDS.

No. 869,011.     Specification of Letters Patent.     Patented Oct. 22, 1907.

Application filed October 17, 1905. Serial No. 283,113.

*To all whom it may concern:*

Be it known that I, RALPH H. MCKEE, a citizen of the United States, and a resident of Lake Forest, in the county of Lake and State of Illinois, have invented certain new and useful Improvements in Processes of Producing Potassium Compounds, of which the following is a full, clear, and exact description.

My invention relates to the separation of potassium compounds from earthy materials, and more particularly from potash bearing materials containing mica in the forms in which these substances are found in nature.

My invention further relates to the production from the substances above mentioned of a soluble potassium salt, capable of use as a manure and also for manufacturing purposes.

It will be understood that the separation of potassium salts from materials containing mica is attended with some difficulty, owing to the insolubility of the silicious combinations which are involved in the raw material used. I have made the discovery that when potash bearing material containing mica is heated in contact with lime and common salt, the calcium and sodium present unite with a part of the silicic acid, and the potash is left in the mass as a potassium salt, which is readily soluble in water. I have also discovered that if the heat takes place in the presence of fuel, such for instance, as coal, oil or gas, this fuel facilitates the liberation of the soluble potassium salt. Instead of employing lime, an equivalent may be used in the shape of any substance which upon being heated produces lime. It is probable also that other alkaline substances analogous to lime may produce similar effects.

I find that a potash bearing material containing mica and suitable for the purpose above indicated can be had in the shape of a mineral which, when it comes from the earth, is ready to be operated upon. This mineral closely resembles pyrophyllite (silica and alumina) but is unlike ordinary pyrophyllite in that it contains potash.

My preferred method is as follows:—I take 5 parts, by weight, of potash bearing material containing mica, one part, by weight, each of lime stone and common salt, all finely powdered, and mix thoroughly. I then heat the admixture to a temperature corresponding to a bright yellow heat for about two hours, in a furnace, preferably of the rotary type. The resulting material when allowed to cool is in condition to be used for some purposes, and especially as a manure either alone or mixed with other substances. For other purposes, however, it is desirable to separate and also to purify the potassium salt. A good way to do this is to leach the admixture, or to bring it into contact with water, whereupon the potassium salt dissolves, the water being drawn off and evaporated, leaving the potassium salt in comparatively pure form.

I do not limit myself in every instance to the proportions above stated, as I find that the relative quantities may be varied considerably. In fact, they should be varied to some extent, owing to the fact that different specimens of material containing mica possess different proportions of potassium compounds. The temperature and time of heating may also be varied. As a general rule, the lower the temperature the longer will be the time required to finish the heating. If desired, the heating of the substances may be accomplished by means of electricity.

Having thus described my invention, I claim as new and desire to secure by Letters Patent:—

1. The process herein described of producing a soluble potassium salt from potash bearing material containing mica, which consists in heating said material in the presence of lime, common salt and a reducing agent.

2. The process herein described of producing a soluble potassium salt from potash bearing material containing mica, which consists in heating the substance to be operated upon in the presence of lime, common salt and carbonaceous fuel.

3. The process herein described of producing a soluble potassium salt, which consists in treating potash bearing material containing mica with lime and common salt in the presence of a hydrocarbon fuel.

4. The process herein described of producing potassium chlorid, which consists in reducing an admixture of lime and common salt and material containing mica by aid of a reducing agent and heat.

5. The process herein described of producing potassium chlorid, which consists in subjecting, in the presence of lime and common salt and at a high temperature, material containing mica to the action of a substance containing carbon.

6. The process herein described of producing soluble potassium salt, which consists in heating a mica containing material with lime and common salt in the presence of a reducing agent, allowing the same to cool, subjecting the substance thus formed to the action of water so as to dissolve out the soluble potassium salt, and finally evaporating said water so as to leave said potassium salt in a solid form.

7. The process herein described, of producing soluble potassium salts, which consists in heating the above described mica-containing material with lime and common salt in the presence of a reducing agent, allowing the resulting substance to cool, and finally removing from said resulting substance, the potassium salt.

In testimony whereof I have signed my name to this specification in the presence of two subscribing witnesses.

RALPH H. McKEE.

Witnesses:
   ALBERT DUANE JACKMAN,
   LLOYD M. BURGHART.